Sept. 1, 1959 J. I. CARASSO ET AL 2,902,419

METHODS FOR THE TREATMENT OF SEMI-CONDUCTOR JUNCTION DEVICES

Filed Feb. 25, 1957 2 Sheets-Sheet 1

INVENTORS
JOHN I. CARASSO &
ERIC ALFRED SPEIGHT
BY Hall & Houghton
ATTORNEY

Sept. 1, 1959 J. I. CARASSO ET AL 2,902,419

METHODS FOR THE TREATMENT OF SEMI-CONDUCTOR JUNCTION DEVICES

Filed Feb. 25, 1957 2 Sheets-Sheet 2

INVENTOR
JOHN I. CARASSO &
ERIC ALFRED SPEIGHT,
BY Hall & Houghton
ATTORNEY 2,902,419

METHODS FOR THE TREATMENT OF SEMI-CONDUCTOR JUNCTION DEVICES

John Isaac Carasso, Cricklewood, London, and Eric Alfred Speight, Wimbledon Park, London, England Application February 25, 1957, Serial No. 642,141
11 Claims. (Cl. 204—141)

Figure 1:
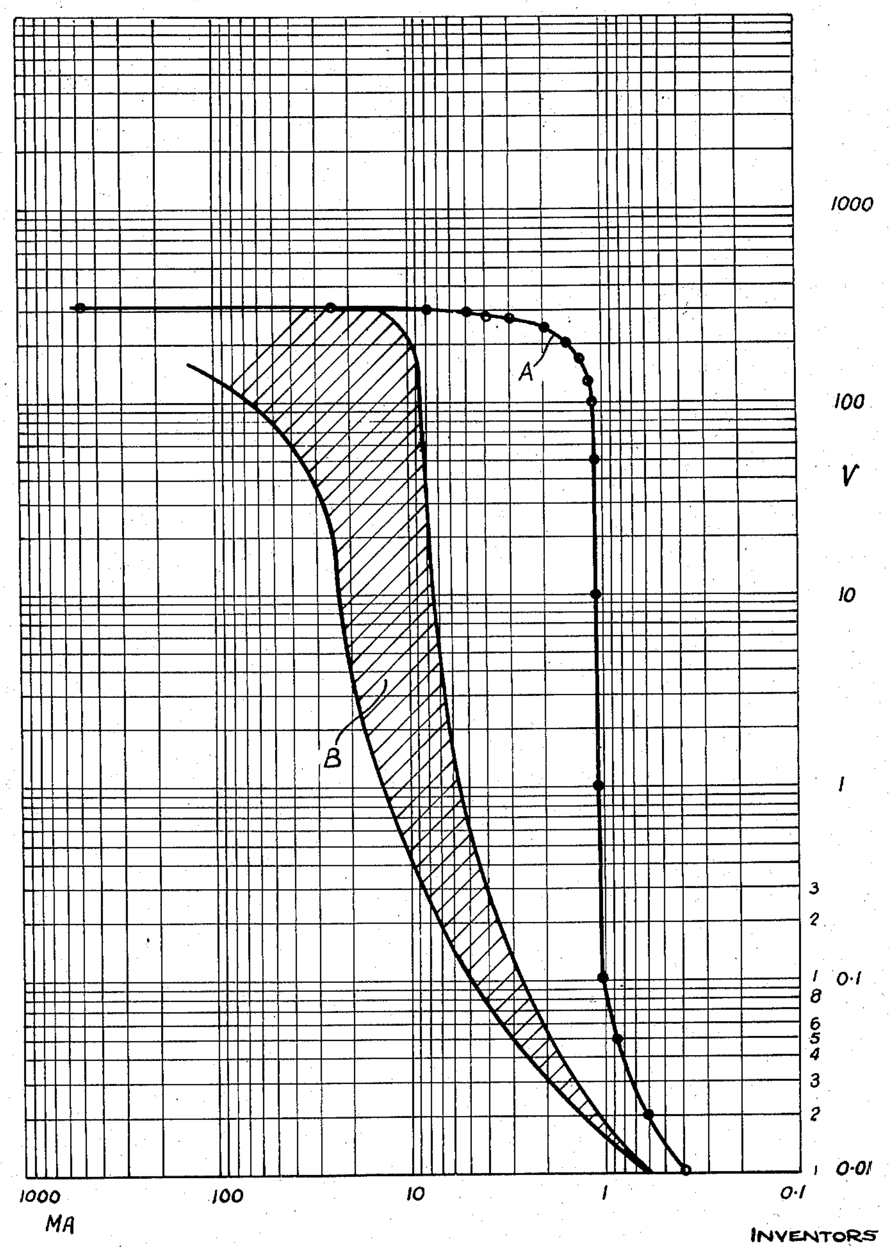

This invention relates to methods for the treatment of semi-conducting material and semi-conductor junction devices, for example, germanium junction devices, in the later stages of manufacture designed to remove harmful contaminants from the surface of the device to leave that surface in a condition such as enables the device to exhibit its optimum performance.

One previously proposed method for the surface treatment consists of immersion in a suitable chemical etching solution which, by dissolving the contaminated surface layer produces a clean surface. In another method the surface is etched electrolytically by immersing it in an electrolytic solution which may consist of sodium or potassium hydroxide solution, and passing a current between the surface and an indifferent electrode, the surface being the anode, when the surface layer of the device is again dissolved due to anodic oxidation followed by dissolution of the oxide so formed in the alkaline bath.

Both the methods just described when used with proper care yield satisfactory results, namely, a surface having a low recombination rate for minority carriers, and generally free from impurities which cause departures from the ideal current and voltage characteristic of a subsequently prepared junction, for example those known as "channels" and "softness of the breakdown knee."

However, the presence in the etching solution of even minute traces of some dissolved metallic impurities such as those which might arise from insufficiently pure reagents or from chemical attack of the metallic parts of a junction device can cause troublesome departures from the ideal characteristic referred to above. This necessitates extreme care in the preparation and use of the etching solution and during etching, to avoid immersing potentially contaminating parts of the device in the solution or protection of these parts by means such as by gold plating. In spite of such precautions, it is not uncommonly found that the etching treatment fails to have the required effect, possibly because the precautions are not completely effective in excluding deleterious metallic impurities from the etching solution.

It is the purpose of the present invention to provide a simple process which will enable the treatment of the surface to be performed satisfactorily and reliably even when the etching solution contains relatively large quantities of normally harmful dissolved metallic impurities.

According to the present invention a method of treating the surface of a body of semi-conducting material or a semi-conductor junction device comprises treating the surface in an etching solution containing an agent or agents capable of forming complex compounds with metallic impurities dissolved in the etching solution, both those initially present in the solution and those passing thereinto during treatment of such surface so as to prevent contamination of the surface by the dissolved impurities.

In one particular method according to the invention, the etching solution contains one or more chelating agents. Alternatively, organic complexing agents may be used and may be selected from the amino-, imino-, nitrilo-polycarboxylic group of acids which are referred to as "complexones" (the properties of complexones are described in a paper by G. Schwarzenbach in Analyst 80, 1955, 713). In particular, the sodium and potassium salts of those acids are especially effective. Other suitable substances are the salts of nitrilotriacetic acid and of imino-diacetic acid.

Preferably the complexones should be employed in conjunction with a suitable auxiliary complexing agent when it is desired to complex the cations of heavy metals such as iron, copper or nickel in strongly alkaline solution. Tartrate ions are particularly satisfactory as the auxiliary complexing agent but other suitable agents, for example, cyanide or citrate ions may be used instead. These ions may be derived from tartaric acid, hydrocyanic acid or citric acid.

Figure 2:
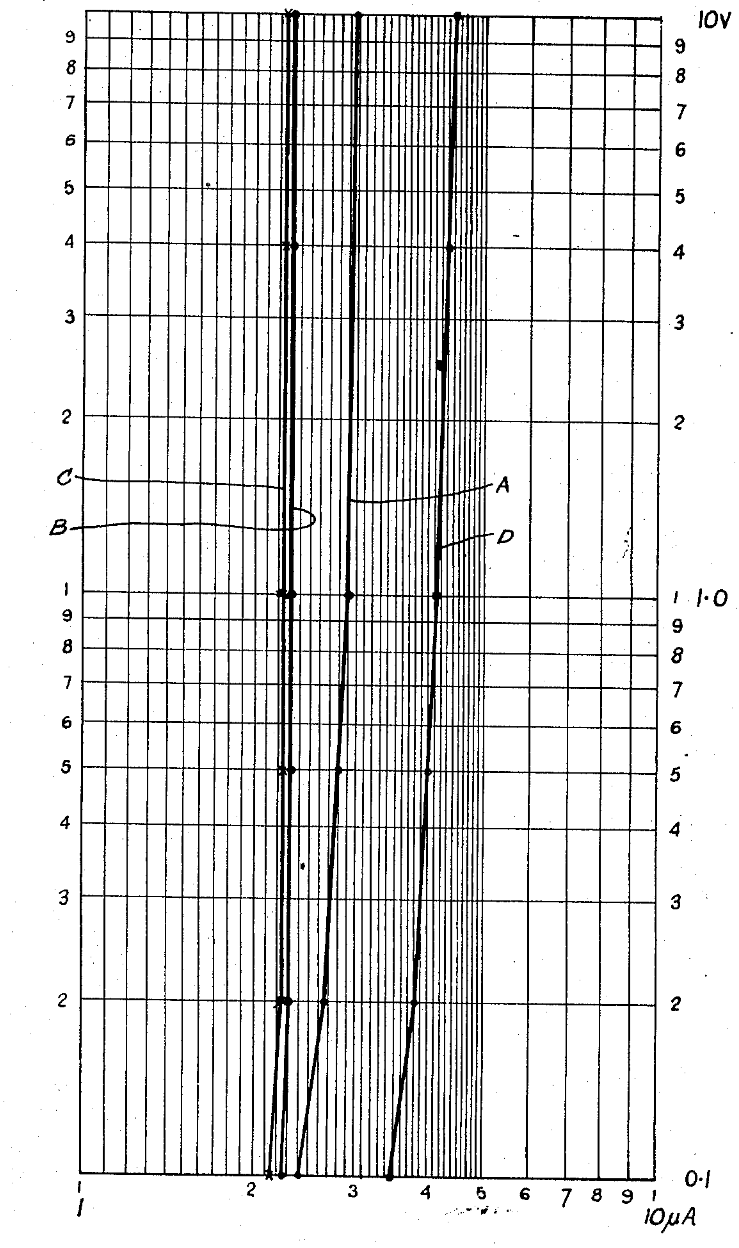

Methods of etching germanium junction devices will now be described in greater detail with reference to the accompanying drawings of which:

Figure 1 is a graph showing for comparison the current-voltage characteristics of germanium junction devices after electrolytic etching in a solution according to one method of the invention and after similar etching in a solution from which certain constituents of the invention were omitted, and Figure 2 is a graph showing current-voltage characteristics of germanium junction devices after chemical etching in a solution according to another method of the invention, after similar etching in a solution of the invention deliberately contaminated, and after similar etching in a deliberately contaminated solution from which certain constituents of the invention were omitted.

In one particular method according to the invention, a germanium junction device is etched electrolytically in a solution prepared from potassium hydroxide (10–30% by weight), tartaric acid (1–2% by weight), and disodium dihydrogen ethylene-diamine tetra-acetate (2–4% by weight). Dipotassion dihydrogen ethylene diamine tetra-acetate may be used instead of the disodium salt. It should, however, be understood that the composition of the solution is in no way critical; the minimum amounts of the complexing constituents depend on the amount of metallic impurities likely to be encountered in practice, and will therefore vary from case to case. Similarly there is no upper limit to the amounts of such constituents which can be tolerated except that which is set by their solubility in the aqueous medium. The concentration of alkali is likewise uncritical. An etching solution of the above composition yields satisfactory results even when it is deliberately contaminated with impurities present simultaneously in the following concentrations:

| Ni, percent | Pb, percent | Sn, percent | Zn, percent | Cu, percent |
|---|---|---|---|---|
| 0.1 | 0.3 | 0.1 | 0.5 | 0.1 |

as demonstrated by Fig. 1 in which curve A depicts the current-voltage characteristic of a pn junction device, measured in dry air after electrolytic etching with the above mentioned solution deliberately contaminated. The characteristic obtained in the absence of these deliberately added impurities is indistinguishable from curve A. The salient features of this curve are the current saturation from 0.1 volt reverse bias upwards, in accordance with Shockley's theory (Bell System Technical Journal, 88, 1949, 101), showing the absence of surface "channels," and the sharpness of the curvature of the breakdown knee. This results in a doubling of the value of the reverse current at 80% of the maximum reverse voltage in accordance with McAfee and McKay's calculations on avalanche electron multiplication in the pre-breakdown region (Physical Review, 91, 1953, 1079) showing the absence of "softness" induced by surface impurities. When etching was attempted using a similarly contaminated alkaline solution from which the tartaric acid and the complexones were omitted the characteristics obtained lay in the shaded region B showing both channels and surface breakdown.

The value and duration of the electrolysing current can be carried within wide limits, according to the depth to which it is desired to attack the device. A current of 1–10 ma., applied for times of the order of seconds or minutes, is satisfactory for devices of dimensions normal for small signal applications, but larger currents, or times, or both, may be required for so-called "power" junction rectifiers or transistors.

In another preferred method according to the invention a germanium device is etched chemically in a solution consisting, for example, of hydrogen peroxide (5–20% by weight) potassium hydroxide (5–30% by weight), tartaric acid (1–2% by weight) and disodium or dipotassium dihydrogen ethylenediamine tetra-acetate (2–4% by weight). Brief immersion (10–100 seconds) of the device in this solution, which is preferably employed warm (40–80° C.), confers the ideal characteristics to a contaminated pn junction, as shown in Fig. 2, curves A and B of which show the current-voltage characteristics of devices thus treated. The result is equally satisfactory when the etching solution is deliberately contaminated with 0.05% of copper (curve C). In the absence of complexing agents, however, the same concentration of added copper results in the formation of a considerable channel (curve D).

The concentrations of the reagents employed in this etching treatment are relatively uncritical. Furthermore, other compositions of the chemical etching solution can be successfully employed provided that appropriate additions of complexing agents are made as disclosed herein.

Methods in accordance with the invention may also be applied to semi-conductors and semi-conductor devices made from silicon and other suitable materials.

We claim:

1. A method of etching the surface of a body of semiconducting material and of semi-conductor junction devices comprising etching the surface in a solution consisting essentially of a complexone, 2–4% by weight, an auxiliary complexing agent, 1–2% by weight, and an alkaline metal hydroxide, 5–30% by weight.

2. A method according to claim 1 in which the complexone is ethylenediamine tetra-acetic acid present in the solution in the form of an ionisable salt.

3. A method according to claim 1 in which the complexone is imino diacetic acid present in the solution in the form of an ionisable salt.

4. A method according to claim 1 in which the complexone is nitrilo triacetic acid present in the solution in the form of an ionisable salt.

5. A method according to claim 1 in which the auxiliary complexing agent is selected from the group consisting of citric acid, and tartaric acid.

6. A method of etching the surface of a body of germanium and of germanium semi-conductor junction devices comprising electrolytically etching the germanium surface in a solution consisting essentially of potassium hydroxide, 10–30% by weight, tartaric acid, 1–2% by weight, and disodium dihydrogen ethylenediamine tetraacetate, 2–4% by weight.

7. A method of etching the surface of a body of germanium and of germanium semi-conductor junction devices by chemically etching the germanium surface in a solution consisting essentially of hydrogen peroxide, 5–20% by weight, potassium hydroxide, 5–30% by weight, tartaric acid, 1–2% by weight, and disodium dihydrogen ethylenediamine tetra-acetate, 2–4% by weight, for a period of from 10 to 100 seconds.

8. A method according to claim 7 in which the solution is employed at a temperature within the range of 40° to 80° C.

9. A method according to claim 1 in which the auxiliary complexing agent is hydrocyanic acid.

10. A method of etching the surface of a body of germanium and of germanium semi-conductor junction devices comprising electrolytically etching the germanium surface in a solution consisting essentially of potassium hydroxide, 5–30% by weight, tartaric acid, 1–2% by weight, and a salt of ethylene diamine tetra-acetic acid, 2–4% by weight.

11. A method of etching the surface of a body of germanium and of germanium semi-conductor junction devices comprising chemically etching the germanium surface in a solution consisting essentially of hydrogen peroxide, 5–20% by weight, potassium hydroxide, 5–30% by weight, a salt of tartaric acid, 1–2% by weight, and a salt of ethylene diamine tetra acetic acid, 2–4% by weight, for a period of from 10 to 100 seconds.

References Cited in the file of this patent

UNITED STATES PATENTS

| | | |
|---|---|---|
| 2,656,496 | Sparks | Oct. 20, 1953 |
| 2,736,639 | Ellis | Feb. 28, 1956 |
| 2,738,259 | Ellis | Mar. 13, 1956 |
| 2,739,882 | Ellis | Mar. 27, 1956 |

UNITED STATES PATENT OFFICE

CERTIFICATE OF CORRECTION

Patent No. 2,902,419 September 1, 1959

John Isaac Carasso et al

It is hereby certified that error appears in the above numbered patent requiring correction and that the said Letters Patent should read as corrected below.

In the heading to the printed specification, between lines 6 and 7, insert -- Claims priority, application Great Britain February 24, 1956 --.

Signed and sealed this 19th day of April 1960.

(SEAL)
Attest:

KARL H. AXLINE
Attesting Officer

ROBERT C. WATSON
Commissioner of Patents